United States Patent Office 2,865,710
Patented Dec. 23, 1958

2,865,710

PROCESS OF DEFLUORINATION OF PHOSPHORUS COMPOUNDS

Ira M. Le Baron, Evanston, Ill., assignor to International Minerals & Chemical Corporation, a corporation of New York No Drawing. Application July 21, 1955
Serial No. 523,611

11 Claims. (Cl. 23—108)

This invention relates to the production of a phosphorus feed supplement. In the past, various attempts have been made to produce a product in which the phosphorus has a high biological availability in animal feeds and in which the fluorine content is extremely low. Such a product is used as a feed supplement to eliminate phosphorus deficiencies in animal feeds. There are two general forms of defluorinated phosphate rock used as feed at the present time: One is the form in which the material is largely beta tricalcium phosphate which, while being a useful feed supplement, contains a considerable percentage of phosphorus which is not readily available as measured by the conventional chemical solubility tests and by animal feeding trials. The other type is one in which the material is largely in the alpha form of tricalcium phosphate, which is also an excellent feed supplement. It contains a high portion of the $P_2O_5$ in available form as measured by the conventional A. O. A. C. citrate solubility method and by animal feeding tests.

This invention covers the production of a defluorinated phosphate rock for feed purposes, which has a low fluorine content, a high total $P_2O_5$ content, and in which a high percentage of this total $P_2O_5$ content is present as available $P_2O_5$. Phosphate rock, which ordinarily has from 2 to 3.5% fluorine, is treated with orthophosphoric acid and subjected to temperatures ranging between about 1150 and about 1400° C. in a rotary kiln. The granular product from this rotary kiln has in the past been allowed to air-cool and has then been ground. This product is described in U. S. Patent No. 2,442,969. It has been found, however, that this product was chiefly tricalcium phosphate in the beta form. The present invention relates to producing a phosphatic material with approximately the same chemical analysis, but wherein the available $P_2O_5$ content is considerably increased over that heretofore produced and in which a substantial and major portion is in the alpha form. There is a major portion of the product which appears to be in the alpha crystalline form of tricalcium phosphate.

The feed material which is suitable for use in practicing the present invention is of two types: Acidulated phosphate rock, after partially defluorinating is the feed material for the process. Thus, for example, the products obtained by Shoeld (Reissue Patent No. 22,500), Wight et al. (U. S. Patent No. 2,234,511), or Butt (U. S. Patents Nos. 2,360,197 and 2,442,969) in each instance are suitable for use as feed materials in the instant process. Butt, 2,442,969, discloses the preparation of a partially defluorinated tricalcium phosphate having a CaO to $P_2O_5$ mole ratio in the range between about 2.7:1 and about 3.1:1 through the reaction of orthophosphoric acid on phosphate rock which has been beneficiated. This product is especially useful as a feed material for the instant process. In addition to the product obtained by this process, a product obtained by following the Butt process but using a major portion of orthophosphoric acid and a minor portion of sulfuric acid, followed by a partial thermal defluorination, is also suitable. Particularly in the case of beneficiated phosphates which have been treated with a mineral acid such as orthophosphoric acid and/or sulfuric acid, or with silica with or without sodium oxide or sodium carbonate, a gradual heating of these materials to a temperature below the temperature of complete melting or fusion of the material has been practiced in the past. Such materials are suitable for use as feed materials to the present operation. There is, of course, some variation in the final temperature obtained in these defluorination operations; but in general a gradual heating of the material or mixtures of material up to around 1200–1300° C. accomplishes the desired degree of partial defluorination without inducing any substantial amount of fusing or melting of the material. The materials obtained by these processes of partial defluorination may be directly used in the process of the instant invention or they may be cooled, stored, and used when and as desired.

The calcined material as produced by the aforementioned patents is subjected to a temperature above its melting or fusion point, in any suitable apparatus for high temperature heating, such as an electric furnace (either induction or direct arc), or an oil or gas fired reverberatory furnace. The temperature of this material—usually between about 1500–1650° C.—is not critical provided it is sufficiently high to render the feed ultimately in the molten condition, nor is it critical with respect to the length of time under which this material is maintained in a molten condition so long as it is substantially instantaneously, completely and entirely converted into a molten condition. However, particularly in the case of previously uncalcined material, the longer the material is held in the molten state, the lower the fluorine content will be. Twenty minutes in the molten state is sufficient for previously calcined material; up to 6 hours is sufficient for previously uncalcined material. In either case, it has been found that the feed materials should be placed in a molten state or condition by heating the material to a molten state as quickly as practical. Thus, for example, if a partially defluorinated feed material is obtained at a temperature of about 1200° C., it is directly and while at this temperature subjected to a temperature of about 1600° C., which results in the melting and fusion of the material. This is done economically by one method in a reverberatory furnace or other vessel having a large pool of previously molten material obtained from the same feed source, the fresh feed being directly introduced into the molten pool. The hot gases from the furnace may be further used in the calcining and initial defluorination operation in preparing the feed material for the reverberatory furnace. In addition, it is to be noted that materials which have been stored, but which have been allowed to reach substantial atmospheric temperatures, need not be first reheated to a temperature of approximately 1200° C. but may be directly added, while at atmospheric temperatures, into the molten bath or pool of the previously fused material. Phosphate rock which has been acidulated with one or more mineral acids, such as orthophosphoric, sulfuric, nitric, hydrochloric, etc., either with or without subsequent curing or storage, may be directly added to the molten pool of material and thus melted or fused or such material first calcined as before described may be directly introduced into the molten body of material.

In a reverberatory furnace, the rate of heating the pool of molten material is sufficiently rapid to enable the solid calcined feed material to be added to the pool of molten material at the rate of about 5 pounds or less of feed per minute per 100 pounds of melt, thus giving a minimum retention time in the melt of at least twenty minutes. Large amounts of feed may be added thus giving shorter retention times, and with satisfactory fluorine removal, if the rate of heat addition is high enough to maintain the body of molten material in molten condition. Usually, however, from a practical standpoint, the practical limitation is the rate of heat addition for this particular type of equipment, namely, a reverberatory furnace. However, in an electric arc furnace, the rate of heat addition is much higher so that up to about 15 pounds per minute of solid per 100 pounds of melt can be added without encountering the danger of reducing the temperature of the melt below the fusion point. It is understood, of course, that in the case of continuous separation, the volume of the molten pool remains substantially constant with the same amount of molten product being withdrawn as the solid feed being continuously added. In batch or intermittent operations, the limiting factor as to the amount of solid feed added at any one time is the same factor as in continuous operations, namely, the danger of lowering the melt temperature at least momentarily below the fusion temperature. The size of the charge added at any one time to the molten pool on either a batch or continuous basis must be sufficiently small so as to avoid reducing the pool temperature below its fusion point. It is essential to the successful operation of the present novel process that the solid feed material be quickly melted, i. e., substantially immediately melted or shock melted in order to remove substantially all of the fluorine contained in the feed material. In the case of previously calcined material, practically all of the fluorine current is removed just as soon as the material attains its molten state.

The molten material is withdrawn from the heating chamber in any suitable manner, as by gravity, or by means of applied pneumatic pressure. The material may be withdrawn in the form of a small molten stream or, if pressure is employed, it may be sprayed or atomized from the melting furnace.

One of the important aspects of this invention also lies in the speed with which the molten material being removed from the heating chamber is cooled or quenched. A rapid cooling tends to produce material of the desired alpha crystalline form. The molten material is allowed to air-cool contains a markedly lower percentage of available $P_2O_5$ in this desirable form than is the case if this same molten material is subjected to an immediate and drastic supercooling. This supercooling should be accomplished within about two seconds between the time of removal of the material from the furnace and the time within which it is reduced in temperature by at least 600–1000° C. The material should be cooled as quickly as possible to a temperature of 500° C. or below. Of course, the period between the removal of the molten material and the time it is quenched or drastically cooled may range up to three or four seconds, but it is desirable to reduce this time to an absolute minimum. If mechanical devices, commercially available, can be secured so that the time lag between the removal of material from the furnace and the application of the quenching action to the withdrawn material can be reduced to as short as one-half or one second, a final product will be produced having a higher available and assimilable $P_2O_5$ content for animals than has heretofore been attainable.

The quenching of this material may be accomplished in any suitable convenient manner. One method which has been used is to allow a small smooth stream of this molten material withdrawn from the furnace and introduced into a pool or large body of water; another method is to atomize or spray the molten material in a bath or pool of water; still another method of accomplishing this rapid quenching of this molten material is to direct a jet or plurality of jets of relatively high-pressure streams of water into the stream of molten material so that there is a rapid dissipation of heat and thus a supercooling of the molten material; and still another method is by the use of two or more opposing high-pressure jets of water impinging upon the stream of molten material.

One of the principal obstacles to the successful operation of the instant novel process resides in the great difficulty in maintaining the furnace refractory material relatively free from substantial erosion, spalling and corrosion by the molten material. No conventional refractory material tried so far in a reverberatory furnace has been entirely satisfactory from this standpoint. However, it has now been discovered that the best material for lining the furnace walls that come in contact with the molten pool of material is the solidified previously fused material itself. In order to accomplish the placing of such material, the furnace walls have heat resistant metal cooling pipes or tubes imbedded in them. Once the initial molten pool of phosphate material has been formed within the furnace chamber, cool or cold air or other cool gaseous fluids or liquids, such as water, are introduced into the cooling tubes by force, the rate of passage and the degree of coolness being sufficient to maintain a lining of solidified fused material adjacent the furnace lining of sufficient thickness usually between about 2 and about 6 inches to prevent direct contact of molten material with the furnace lining structure.

The process may be carried out in a continuous manner, or batchwise, as desired; preferably a continuous process is employed. The feed material to the process may be continuously prepared and continuously fed to the reverberatory furnace or other suitable heating chamber; or, if desired, the feed material may be prepared wholly independent of the fusion or melting process and fed to it either continuously or batchwise.

As an illustration of the present invention, but with no intention of being limited thereto, the following examples are given:

*Example 1*

A reverberatory furnace maintained at a temperature of about 1560–1620° C. was fed at a rate of about one-half pound per minute with calcined, phosphoric acid-treated phosphate rock produced according to the Butt process, U. S. Patent No. 2,442,969. The pool of molten material into which the feed was introduced was feed material which had been previously melted. It amounted to a total of about 100 pounds. However, in this application of the calcination process, the material is not held in the kiln a sufficient time to produce the usual extremely low fluorine content. Only about two-thirds of the fluorine was removed by the calcination. A pool of the feed material in molten condition was maintained in the furnace. At intervals, the furnace was tapped and a molten stream of material withdrawn therefrom. The material withdrawn was treated in three different ways: One portion of the material withdrawn had a total time, between the time of quenching to below 500° C. in a pool of water and its withdrawal from the furnace, of about two seconds or slightly less. A second aliquot of the same material was withdrawn and quenched, allowing a time interval between the two operations of between about two and about ten seconds. A third portion of this same material was permitted to cool, approximately at equilibrium in the furnace, to atmospheric temperature. The material quenched after only a two-second time lag was found to be, according to X-ray defraction pattern examination, largely alpha tricalcium phosphate. This material contained about 41% by weight of total $P_2O_5$, of which about 72% by weight was available $P_2O_5$. The material produced using a two to a ten-second time lag, and having the same total $P_2O_5$ analysis, contained a major portion of alpha tricalcium phosphate as indicated by X-ray defraction examination, but also contained a minor quantity of beta tricalcium phosphate as evidenced by the X-ray defraction pictures. Of the total $P_2O_5$ content present, this material contained about 15% by weight of available $P_2O_5$. The material allowed to furnace-cool under equilibrium conditions to atmospheric temperature over a period of approximately two days had a total $P_2O_5$ content of 41% by weight. This material was essentially beta tricalcium phosphate and had an available $P_2O_5$ content of approximately 10% of the total $P_2O_5$ content.

The feed material introduced into the reverberatory furnace had a fluorine content of approximately .571% by weight. When the material was withdrawn from the furnace, after an average retention time of about one hour, it had a fluorine content of about .0055% by weight, showing that a decrease in fluorine content of approximately 99% occurred as a result of fusing this material and holding in the molten condition for the holding period above stated. If the holding period is increased, the feed rate may be greatly increased without impairing the fluorine removal.

*Example II*

A series of comparative runs were made on beneficiated Florida phosphate rock which had been acid-treated and calcined in the presence of water vapor at a temperature of about 1100–1400° C. In one series of runs, the comminuted phosphate rock was treated with sulfuric acid of about 66° Bé. in slight molar excess over that required to completely react with all the tricalcium phosphate present. After curing, the superphosphate was comminuted and fed through a calciner at the above-stated temperature with the addition of water vapor, in order to partially defluorinate the same. The product analyzed about 30.79% by weight of total $P_2O_5$, about 13.8% by weight of available $P_2O_5$, and about 0.07% by weight of fluorine. At no stage in the production of this product was the calcining temperature allowed to be sufficiently high so that any substantial amount of fusion or melting occurred. This product was then melted and fused at a temperature of about 1500° C., by introducing about 2.5 pounds per minute of the material directly into a molten pool of the material weighing about 50 pounds, and then quenched by allowing the same amount of molten material as was being introduced to flow in a small stream from the molten pool of material while jetting a stream of water into the molten stream. The average length of time of feed in the molten pool was about twenty minutes. Less than two seconds elapsed between the time of withdrawal of the molten stream and the time that the jet of water contacted the molten stream. The product obtained contained about 32.29% by weight of total $P_2O_5$, about 24.93% by weight of available $P_2O_5$, and about 0.003% by weight of fluorine.

In another series of comparative runs, the feed material for the fusion step was prepared from the same phosphate rock and in the same manner as described in Example II, but orthophosphoric acid was used in place of sulfuric acid, and a triple superphosphate product was calcined in place of superphosphate. The calcined product analyzed about 43.3% by weight of total $P_2O_5$, about 2.3% by weight of available $P_2O_5$, and about 0.08% by weight of fluorine. This product was then fused and quenched with water, as described in Example II. The final product contained about 43.5% by weight of total $P_2O_5$, about 23.4% by weight of available $P_2O_5$, and only about 0.0045% by weight of fluorine. In this series of runs it is apparent that although the total $P_2O_5$ content of the feed material to the fusion operation and of the quenched product remained substantially the same, ten times as much of it became available in the quenched product as was available in the calcined product which was the feed material to the fusion process. At the same time, the final product shows a decrease of over 94.0% in the amount of fluorine present in the final product, as compared with the amount in the material fed to the fusion step.

Material produced in accordance with Examples I and II was compared with defluorinated, acidulated phosphate rock which had been calcined in conformity to prior processes. Fused and quenched defluorinated alpha tricalcium phosphate was compared with defluorinated calcined tricalcium phosphate in animal feeding tests using chicks as the test animals. The tricalcium phosphate prepared by quick fusion and then immediate quenching was much superior to the tricalcium phosphate prepared through a final calcination process only. Not only are the novel products of the present invention superior to ordinary calcined tricalcium phosphate in producing better growth and better bone calcification when fed at the same levels or concentration in the chick diet, but the A. O. A. C. solubility tests show that the available $P_2O_5$ is greater in the quick fused-quick quenched material as compared with that of the calcined material.

*Example III*

Phosphate rock containing about 3.52% of fluorine was acidulated with approximately equimolar amounts of sulfuric and phosphoric acids to a total acidulation of about 110%, based on the tricalcium phosphate contained in the rock being converted to monocalcium phosphate and excluding the amount of acid required to react with the iron oxide and alumina impurities present. This material was charged to an oil-fired reverberatory furnace wherein the molten pool of material was maintained at about 1565° C. to 1600° C. After introduction of the uncalcined feed into the molten pool of material was completed (about 5 pounds of solid feed being introduced at any one time per 100 pounds of molten material after the initial pool was formed), increments of the molten pool were withdrawn after being retained in the pool for 1, 2, 3, 4.5, 5.5 and 6.5 hours. The fluorine analyses for the samples so withdrawn were respectively about 0.73%, 0.74%, 0.36%, 0.28%, 0.19% and 0.08%. After an additional three hours of heating in molten condition, the fluorine content was about 0.04%. As previously shown, the same type of acidulated phosphate rock previously calcined below fusion temperature, although only effecting a partial defluorination yielded a product of lower fluorine content upon quick fusion and with a retention time of only 20 to 45 minutes, containing only about one-tenth as much fluorine as the product obtained in this example after a six hour retention time.

Having thus full described the invention, what is desired to be secured by Letters Patent is:

1. A process of preparing defluorinated phosphates a substantial portion of which are in alpha form which comprises directly introducing, for quick fusion, a fluorine-containing superphosphate, prepared by calcination at a temperature below its fusion temperature, into a mass of said material being maintained in the molten state at temperatures below volatilizing temperatures for phosphorus constituents in the ratio and at the rate of not more than about 15 pounds of solid feed material per minute per 100 pounds of molten material, removing at least a portion of said molten mass when homogeneous and quenching the removed portion within at least ten seconds after its removal from the molten bath.

2. A process of preparing defluorinated phosphates a substantial portion of which are in alpha form which comprises directly introducing, for quick fusion, a fluorine-containing superphosphate, prepared by calcination at a temperature below its fusion temperature, into a mass of said material being maintained in the molten state at temperatures below volatilizing temperatures for phosphorus constituents in the ratio and at the rate of not more than about 15 pounds of solid feed material per minute per 100 pounds of molten material, maintaining said material in molten condition for at least twenty minutes, removing at least a portion of said molten mass when homogeneous and quenching the removed portion within at least ten seconds after its removal from the molten bath.

3. A process of preparing defluorinated phosphates a substantial portion of which are in alpha form which comprises directly introducing, for quick fusion, a fluorine-containing superphosphate, produced by the action of mineral acid on phosphate rock and partially defluorinating said superphosphate by calcination at a temperature below its fusion temperature, into a mass of said material being maintained in the molten state at temperatures below volatilizing temperatures for phosphorus constituents, in the ratio and at the rate of between about 5 pounds and about 15 pounds of solid feed material per minute per 100 pounds of molten material, removing at least a portion of said molten mass when homogeneous, and quenching the removed portion within at least ten seconds after its removal from the molten bath.

4. A process of preparing defluorinated phosphates a substantial portion of which are in alpha form which comprises directly introducing, for quick fusion, a fluorine-containing superphosphate, produced by the action of mineral acid on phosphate rock and partially defluorinating said superphosphate by calcination at a temperature below its fusion temperature, into a mass of said material being maintained in the molten state at temperatures below volatilizing temperatures for phosphorus constituents, in the ratio and at the rate of between about 5 pounds and about 15 pounds of solid feed material per minute per 100 pounds of molten material, maintaining said material in molten condition for at least twenty minutes, removing at least a portion of said molten mass when homogeneous, and quenching the removed portion within at least ten seconds after its removal from the molten bath.

5. A process of preparing defluorinated phosphates a substantial portion of which are in alpha form which comprises directly introducing, for quick fusion, a fluorine-containing superphosphate, produced by the action of orthophosphoric acid on the phosphate rock and having a CaO to $P_2O_5$ mol ratio in the range between about 2.7:1 and about 3.1:1 and calcination at a temperature below its fusion temperature, into a mass of said material being maintained in the molten state at temperatures below volatilizing temperatures for phosphorus constituents in the ratio and at the rate of not more than about 5 pounds of solid feed material per minute per 100 pounds of molten material, removing at least a portion of said molten mass when homogeneous and quenching the removed portion within at least ten seconds after its removal from the molten bath.

6. A process of preparing defluorinated phosphates a substantial portion of which are in alpha form which comprises directly introducing, for quick fusion, a fluorine-containing superphosphate, produced by the action of orthophosphoric acid on the phosphate rock and having a CaO to $P_2O_5$ mol ratio in the range between about 2.7:1 and about 3.1:1 and calcination at a temperature below its fusion temperature, into a mass of said material being maintained in the molten state at temperatures below volatilizing temperatures for phosphorus constituents in the ratio and at the rate of not more than about 5 pounds of solid feed material per minute per 100 pounds of molten material, maintaining said material in molten condition for at least twenty minutes, removing at least a portion of said molten mass when homogeneous and quenching the removed portion within at least ten seconds after its removal from the molten bath.

7. A process of preparing defluorinated phosphates a substantial portion of which are in alpha form which comprises directly introducing, for quick fusion, a fluorine-containing superphosphate produced by the action of sulfuric acid on phosphate rock and calcination at a temperature below its fusion temperature, into a mass of said material being maintained in the molten state at temperatures below volatilizing temperatures for phosphorus constituents, in the ratio and at the rate of not more than about 5 pounds of solid feed material per minute per 100 pounds of molten material, removing at least a portion of said molten mass when homogeneous and quenching the removed portion within at least ten seconds after its removal from the molten bath.

8. A process of preparing defluorinated phosphates a substantial portion of which are in alpha form which comprises directly introducing, for quick fusion, a fluorine-containing superphosphate produced by the action of sulfuric acid on phosphate rock and calcination at a temperature below its fusion temperature, into a mass of said material being maintained in the molten state at temperatures below volatilizing temperatures for phosphorus constituents, in the ratio and at the rate of not more than about 5 pounds of solid feed material per minute per 100 pounds of molten material, maintaining said material in molten condition for at least twenty minutes, removing at least a portion of said molten mass when homogeneous and quenching the removed portion within at least ten seconds after its removal from the molten bath.

9. A process of preparing defluorinated phosphates a substantial portion of which are in alpha form which comprises calcining, without fusion, an acid decomposed fluorine-containing phosphate rock having a CaO to $P_2O_5$ mol ratio in the range between about 2.7:1 and about 3.1:1, at a temperature in the range between about 1200° C. and about 1400° C., to partially defluorinate same, directly introducing said partially defluorinated superphosphate into a mass of said material being maintained in the molten state at temperatures in the range between about 1500° C. and about 1650° C. in the ratio and at the rate of between about 5 pounds and about 15 pounds of solid feed material per minute per 100 pounds of molten material, removing at least a portion of said molten mass and quenching the removed portion within at least ten seconds after its removal from the molten bath.

10. A process for preparing defluorinated phosphates a substantial portion of which are in alpha form which comprises calcining, without fusion, fluorine-containing triple superphosphate at a temperature in the range between about 1200° C. and about 1400° C., to partially defluorinate the same, directly introducing said partially defluorinated triple superphosphate into a mass of the same material being maintained in the molten state at temperatures in the range between about 1500° C. and about 1650° C., in the ratio and at the rate of between about 5 pounds and about 15 pounds of solid feed material per minute per 100 pounds of molten material, removing at least a portion of said molten mass and quenching the same with a stream of water to a temperature of no higher than about 500° C., within no more than about two seconds.

11. A process for preparing defluorinated phosphates a substantial portion of which are in alpha form which comprises calcining, without fusion, fluorine-containing triple superphosphate at a temperature in the range between about 1200° C. and about 1400° C., to partially defluorinate the same, directly introducing said partially defluorinated triple superphosphate into a mass of the same material being maintained in the molten state at temperatures in the range between about 1500° C. and about 1650° C., in the ratio and at the rate of between about 5 pounds and about 15 pounds of solid feed material per minute per 100 pounds of molten material, maintaining said material in molten condition for more than 5, but less than 10 minutes, removing at least a portion of said molten mass and quenching the same with a stream of water to a temperature of no higher than about 500° C. within no more than about two seconds.

References Cited in the file of this patent

UNITED STATES PATENTS

| | | |
|---|---|---|
| 2,093,176 | Tromel | Sept. 14, 1937 |
| 2,446,978 | Maust | Aug. 10, 1948 |
| 2,539,638 | Schilling | Jan. 30, 1951 |

OTHER REFERENCES

Curtis et al.: Industrial and Engineering Chemistry, vol. 29, No. 7, July 1937, pages 766–770, "Fertilizer From Rock Phosphate."